United States Patent
Denis

[15] 3,680,391
[45] Aug. 1, 1972

[54] BELL GYRO AND METHOD OF MAKING SAME

[72] Inventor: Richard E. Denis, Beverly, Mass.

[73] Assignee: General Motors Corporation, Detroit, Mich.

[22] Filed: Oct. 6, 1969

[21] Appl. No.: 863,861

[52] U.S. Cl. .................................................. 73/505
[51] Int. Cl. .......................................... G01p 9/04
[58] Field of Search ...................................... 73/505

[56] References Cited

UNITED STATES PATENTS

| | | |
|---|---|---|
| 3,307,409 | 3/1967 | Newton ......................... 73/505 |
| 3,408,872 | 11/1968 | Simmons et al. ................ 73/505 |
| 2,753,173 | 7/1956 | Barnaby et al. ................ 73/505 |
| 3,127,775 | 4/1964 | Hansen et al. ................. 73/505 |
| 3,177,727 | 4/1965 | Douglas ......................... 73/505 |

*Primary Examiner*—James J. Gill
*Attorney*—E. W. Christen, A. F. Duke and C. R. Meland

[57] ABSTRACT

A unit for sensing motion of a platform about an input axis, the same being defined by a post upstanding from the platform, a bell-like high-Q member supported by the post and depending therefrom in telescopic relation to the axis, and radial-mode forcers and radial-mode sensors supported by the platform and post within the confines of the bell-like member.

8 Claims, 4 Drawing Figures

INVENTOR
Richard E. Denis
BY
C. L. Meland
ATTORNEY

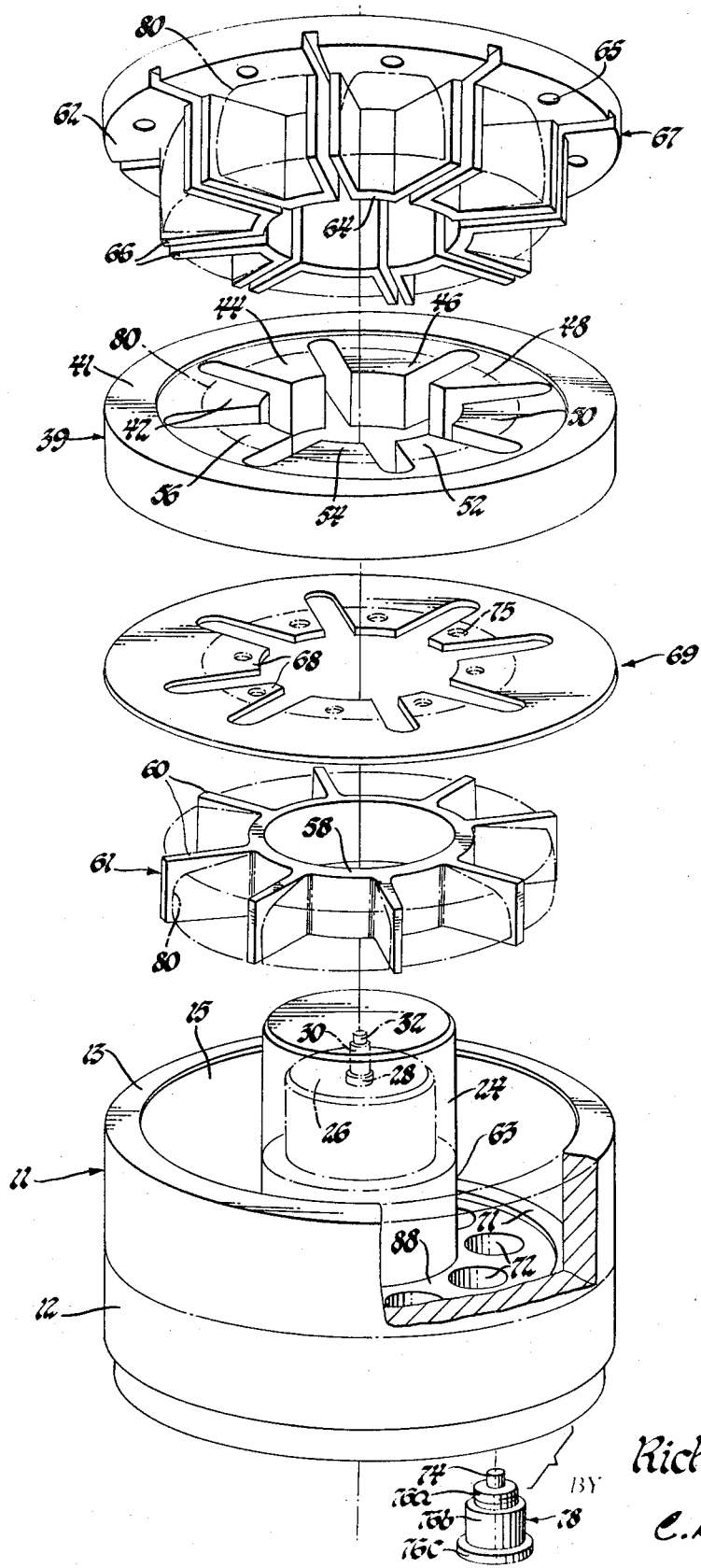

BELL GYRO AND METHOD OF MAKING SAME

This invention relates to an improved device for detecting motion of a platform about an axis by imparting, maintaining, and sensing radial vibrations in a high-Q member capable of sustaining therein a vibration pattern having a nodal and anti-nodal regions. It is particularly directed to such a device applying the method and means described and claimed in U.S. Pat. application, Ser. No. 843,109, entitled "Device for Detecting Rotation about an Axis and Method of Using Same," filed by Alfred G. Emslie on July 18, 1969, assigned to the same assignee as the present invention, and so arranged that the respective components are so organized as to be relatively free from the errors due to physical misalignment.

Several factors could affect the sensitivity with which input rotations are detected by a bell-like apparatus having the lip of a high-Q member exercised radially to maintain a vibration pattern having nodal and anti-nodal regions spaced alternately and equiangularly in the periphery of the lip. For example, displacement of the forcer or part thereof from an associated anti-nodal lip region could cause the imparted vibration pattern to be shifted from its requisite azimuth orientation. Vibrations could then be detected by a sensor associated with nodal lip regions even though the platform does not rotate. Also, misalignment of a sensor from its associated anti-nodal lip region and forming a part of the feedback loop with the forcer could cause errors between the sensed phase and the proper phase for maintaining oscillation. Thus, one factor affecting sensitivity is the degree with which the forcer electrodes are aligned with their associated anti-nodal lip regions. A second factor is the degree with which the sensor electrodes for detecting nodal vibrations when the platform rotates and the sensor electrodes forming part of the feedback loop for self-oscillation of the high-Q member are respectively located at the nodal and anti-nodal regions defined when the platform does not rotate. A third factor is the degree with which relative motion is minimized between the platform and the forcer and sensor electrodes. These errors can cumulate to cause erroneous sensing of platform rotation. Moreover, they can disturb the variation of sensed output vibrations with the magnitude, frequency, and phase of input rate to the platform.

The factors causing such errors are substantially reduced in the present invention. First, the forcer and sensor electrodes are fabricated from the same integral structure in order to provide the desired precision in angular location and to provide dual electrodes for each forcer and sensor function so that inevitable residual alignment errors tend to offset each other. The Q member is then mounted over the multiple electrodes so-fabricated and is rotatably adjusted thereabout so that the nodal and anti-nodal regions defined by the imparted vibration pattern when the platform does not rotate are optimally aligned with their associated electrodes. The second step associated with reducing the sensitivity to these factors is to reduce relative environmental motion between the electrodes and the high-Q member or platform by mounting the electrodes rigidly to both the platform and the post supporting the high-Q member and yet in close proximity with the various nodal and anti-nodal lip regions being vibrated and detected.

In its preferred form, the present invention includes a high-Q bell-like member supported on the platform by a post and depending therefrom in telescopic relation. The bell-like member has sides flaring arcuately outwards and downwards from its axis and the post axis, terminating adjacent the platform in an annular lip capable of sustaining therein a vibration pattern having nodal and anti-nodal regions spaced alternately and equiangularly thereabout. Telescoped within the bell-like member and supported therein by the platform and post is a forcer-and-sensor assembly including eight electrodes that co-act with the lip of the bell-like member equiangularly thereabout. Acting in pairs, some of these electrodes impart, sense, and maintain radial vibrations of the lip at the anti-nodal region. Other pairs of electrodes detect radial vibrations at regions nodal in the absence of platform rotation and then null such vibrations. More particularly, a first pair of electrodes serve as forcers or exercisers that impart radial vibrations in the lip to establish a vibration pattern having four nodal regions and four anti-nodal regions. A second pair of electrodes sense radial vibrations at two of the anti-nodal regions and are electrically connected in feedback circuit with the first pair to generate substantially constant amplitude natural-frequency radial vibrations at the four anti-nodal regions. A third pair of electrodes sense radial vibrations at one set of such nodal regions thereby detecting rotation or input rate of the platform about the axis. A fourth pair of electrodes at the second set of nodal regions are connected in feedback circuit to the third pair to effect nulling vibrations in phase opposite to those detected by the third pair.

It is therefore a general object of this invention to provide a device for detecting motion of a platform about an input axis wherein a bell-like member capable of substantially-similar low-loss radial vibrations along multiple directions radial to the axis encircles and telescopes the electrodes for imparting and sensing radial vibrations in the member.

It is a further object to provide a device for detecting rotation of a platform wherein the electrodes for imparting and sensing vibrations in a high-Q bell-like member are supported from the platform within the confines of bell-like member by the same structure that supports the bell-like member.

It is a further and more specific object of this invention to provide device of the foregoing type, wherein the electrodes imparting and sensing vibrations in the high-Q member are made from the same integral structure.

It is also an object of this invention to provide an economical and precise method of fabricating a platform, post, and electrodes for imparting and sensing vibrations in a member capable of low loss vibrations relative to an axis so as to be concentric and symmetric therealong.

It is another objective to provide a method for angularly locating, securing, and contouring electrodes for imparting, maintaining, and sensing, and nulling low-loss radial vibrations in a high-Q member relative to an axis of symmetry through the member.

It is a further object to provide an apparatus for detecting rotations of a platform wherein the effective Q and other vibrational characteristics of the vibrating member can be controlled by varying the atmosphere.

It is a further and more specific object of the present invention to provide an apparatus to measure rotation of a platform about an axis which embodies features of construction, combination, and arrangement, that facilitates manufacture with a high degree of accuracy through the use of turning techniques, that precisely locates the various parts in relation to each other through the use of mating elements, that permits rotational adjustment of the vibrating bell-like member in relation to the forcer and sensor electrodes to provide maximum correspondence of frequencies, that defines a rigid structure that resists vibration, that accommodates a dual forcer and sensor arrangement and apparatus which diminish alignment errors and their effects, and that in other respects achieves an apparatus that is inexpensive in construction and yet is reliable and accurate in operation.

The invention embodies other novel features, details of which are hereinafter set forth in the specification and claims and illustrated in the accompanying drawings, wherein:

FIG. 2 is an exploded view of a platform carrying a post and electrode assembly suggesting a method of making same.

DETAILED DESCRIPTION — FIG. 1

Figure 1:
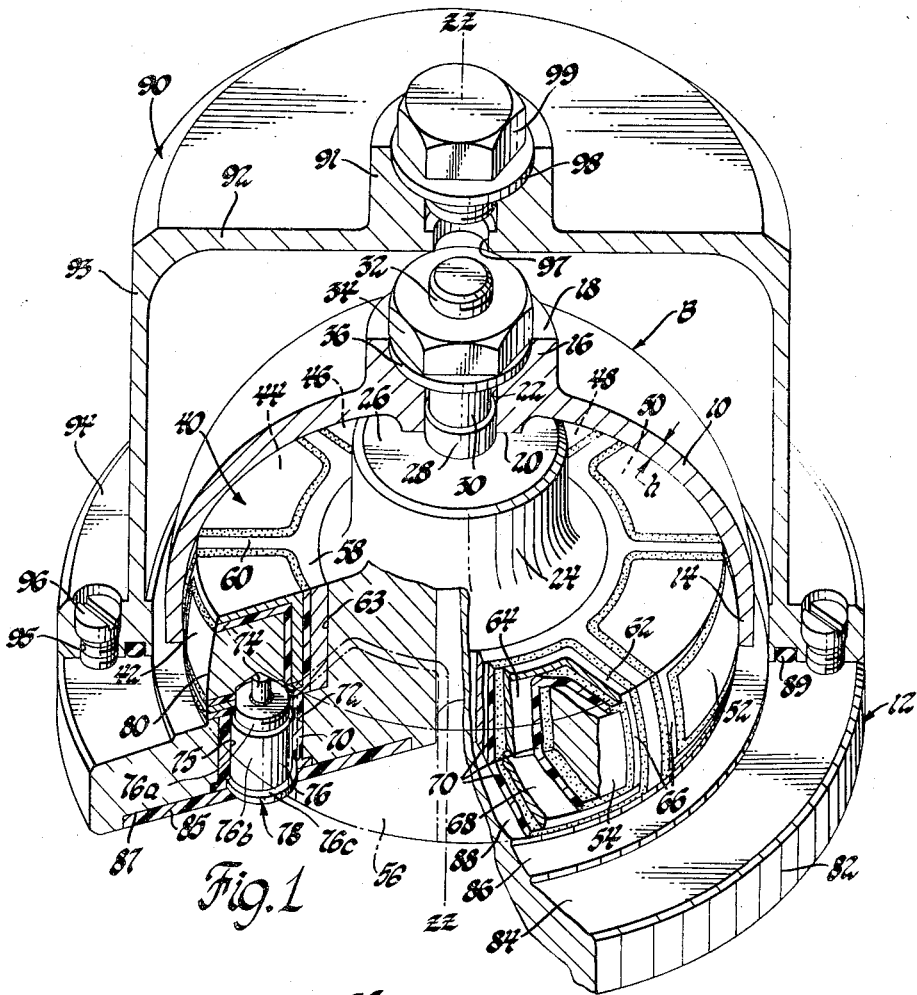
FIG. 1 is of one configuration, partially broken away, showing a bell-like member inverted over and carried by a post also carrying disposed therebetween an electrode assembly

As may be seen with reference to FIG. 1, bell B is comprised of arcuate sides 10 symmetrical about polar or input axis Z—Z. Sides 10 flare from central hub area 16 having upper surface 18, lower surface 20, and a coaxial bore 22 therethrough. Sides 10 are also contiguous with and terminate at cylindrical lip 14. Bell B is supported in an inverted position from central area 16 on post 24 upstanding from platform 12. Bell B and support post 24 are enclosed on platform 12 by cylindrical housing 90, as shown.

In addition to post 24, platform 12 is comprised of a concentric electrode assembly 40 having eight equi-angularly spaced electrodes 42, 44, 46, 48, 50, 52, 54, and 56. As to be described more fully below with reference to FIG. 3, electrodes 42, 48, 50, and 56 are for exercising or forcing associated regions of lip 14 radially by applying varying attractive potentials thereto; and electrodes 44, 46, 52, and 54 are for detecting or sensing radial motion of lip regions by measuring varying potentials thereat. Further elements of the electrode assembly 40 include a shield comprised of ring 58 and spokes 60, a conductive guard comprised of top 62, cylinder 64, arms 66, and base 68, and connector 78 comprised of a probe 74 and isolated guard 76.

Being grounded to platform 12 at surface 63, the shield defines peripheral openings or spaces in platform 12 to receive electrodes and isolates the sensor electrodes at low potential from adjacent forcer electrodes at a high potential. The guard elements expose just the faces of the electrodes to lip 14 and are otherwise electrically-isolated by compound 70 from the platform, shield, and electrodes as shown. The guard elements, moreover, are energized at substantially the potentials of the sensor electrodes to enhance their sensitivity by providing a constant capacitance cage thereabout.

The platform, electrodes, shield, and guard are fabricated from structures shown generally in FIG. 2 as potting cup 11, electrode disk 39, shield ring 61, guard cage 67, and guard base 69, respectively. These structures and especially bell B are made from a high-Q or low-loss material. By high-Q, I refer to the ratio of the energy stored in the oscillating system to the energy dissipated in one cycle. Materials that exhibit favorable Q's, elastic limits, and modulus of elasticity, and yet are readily machinable, include aluminum alloys, such as 2024–T4. This alloy has a composition generally of 93.4 percent aluminum, 4.5 percent copper, 1.5 percent magnesium, and 0.6 percent manganese. Also, silicon-aluminum bronze or "Everdur" alloys, having 96 percent copper, 3 percent silicon, and 1 percent manganese or 91 percent copper, 7 percent aluminum and 2 percent silicon have favorable properties.

Thus, bell B shown in FIG. 1, is preferably constructed from 2024–T4 aluminum having a modulus of elasticity E of $10.6 \times 10^6$ psi and a Q of 3,000 in air, 3,100 in helium and up to 12,000 in $10^{-2}$ torr vacuum. Sides 10 and contiguous cylindrical lip section 14 both have a mean radius of 1 inch and vary in thickness in the arcuate region from maximum $h_o$ in the center region 16 to some finite thickness $h$ in accordance with the formula $h_o (1 + \cos \theta)^2 / 4$, where $\theta$ is the spherical angle subtended from the polar axis through center 16. This thickness contour is believed to provide surfaces of uniform maximum strain when flexed. The lip 14 is of constant thickness $h_o/4$, here approximately 0.050 inches, and has an axial length of approximately 0.25 inches along axis Z—Z. This length is believed to increase the momentum of the sides 10 to afford increased deflection thereof when acted upon by the Coriolis forces mentioned below.

As shown in FIG. 2, potting cup 11 is comprised initially of a platform 12 having a floor 88 extending radially from axis of symmetry Z—Z and terminating in a raised annular lip surface 71. Post 24 of outer diameter 63 extends from floor 88 along axis Z—Z, and cylindrical rim 13 extends from the perimeter of lip 71 in the same direction as post 24. Eight holes 72 are bored into floor 88 equi-angularly about axis Z—Z. So fabricated, potting cup 11 comprises an annular molding cavity 15 used for subsequent assemblying, positioning, and potting of electrode elements. Cavity 15 is defined by the inner diameter of platform rim 13, radially extending floor 88 and lip 71 of platform 12, and surface 63 of post 24.

Guard base 69 is comprised of a ring carrying eight inwardly-extending tabs 68 separated by slots and guard cage 67 is comprised of a top 62 having holes 65 therethrough, cylindrical web portions 64, and eight sets of guard arms 66 protruding radially outwards along web 64. Shield 61 is comprised of a hub 58 carrying eight equi-angularly spaced spokes 60 extending outwards, both the ring and spokes being of substantially the same length as guard web portions 64 and arms 66. The inner diameter of shield hub 58 is selected to mate with the outer diameter 63 of post 24 after assembly theretogether, and the outer diameter of shield hub 58 is spaced from the inner diameter of guard web portions 64 and guard base tabs 68 upon assembly theretogether. Finally, electrode disk 39 is comprised of a ring 41 carrying eight inwardly extending electrode teeth 42, 44, 46, 48, 50, 52, 54, and 56 accurately spaced equi-angularly from each other by slots and having an inner diameter which clears the outer diameter of guard web 64 upon assembly theretogether. The electrode teeth have an axial thickness of approximately 0.375 inches and subtend 30° segments about axis Z—Z separated by 0.1 inch radial slots.

After the potting cup 11 and the elements comprising electrode assembly 40 are fabricated in the forms shown in FIG. 2, the assembly is built up element by element first spot-cementing one element in precise location to the next and then potting the whole assembly with a suitable potting adhesive 70, for example, that known as "P38" obtainable from Bacon Industries of Watertown, Massachusetts. This adhesive is an epoxy resin-base compound chosen because of the stability of its composition and dimensions with time and temperature and its high dielectric strength. Moreover, such potting compound also has high adhesion, low tendency to crack, low coefficient of linear thermal expansion, low creep, and high tensile strength.

Assembled first, shield hub 58 is nested over post 24 and sweat-fitted onto surface 63 so that spokes 60 are midway between holes 72. Then, guard base 69 is spot-cemented at its periphery to floor lip 71 of cup 11 so that tabs 68 are bound by and spaced from shield spokes 60 and are located over holes 72 in floor 88. Electrode disk 39 is then inserted into annulus 15 being spot-cemented at ring 41 to guard base 69 so as to be positioned axially therefrom, radially from the inner diameter of cavity rim 13, and circumferentially so that each electrode tooth 42, 44, 46, 48, 50, 52, 54, and 56 is spaced from shield hub 58 and a guard tab 68 and also between and spaced from shield spokes 60. Guard cage 67 is then spot-cemented to ring 41 so as to be located axially therefrom, radially from cup rim 13, and circumferentially to be bounded by and spaced from shield hub 58, shield spokes 60 and electrodes 42, 44, 46, 48, 50, 52, 54, and 56.

The assembly as positioned is then enveloped by compound 70 as shown, such compound flowing through holes 65 into the spaces between the guards and electrodes and through the space between shield hub 58 and guard web 64 into holes 72. Thereafter, the assembly so molded in potting cup 11 is heated over times and temperatures sufficient to cause epoxy 70 to set up and cure. Then holes 75 for receiving connector 78 are tapped through previously drilled and potted holes 72 and through guard base 68 into the bottom of electrodes 42, 44, 46, 48, 50, 52, 54, and 56.

After such assembling, spot-cementing, and potting, the outside diameters of elements comprising the electrode assembly 40 as well as the outside diameter of platform 12 are greater than the desired final diameters. However, comprising one firmly bonded and machinably-rigid assembly, the assembly is readily lathed in one setup of potting cup 11 on machine centers along axis Z—Z. Aside from the manufacturing economies attendant thereto, such single-setup finishing affords the important concentricity and parallelism about the Z—Z axis among such axially-extending surfaces as electrode assembly surface 80, stem 28, rod 30, and threads 32. Moreover, the squareness of hub surface 26 relative to the Z—Z axis for proper mating with bell hub 20 is also afforded.

Removed first in such a single setup are cup cylinder 13, floor lip 71, and part of floor surface 88, parts of shield spokes 60, the outer ring of guard base 69, electrode ring 41, parts of electrode teeth 42, 44, 46, 48, 50, 52, 54, and 56, the outer ring of guard top 62, and parts of guard arms 66. Then, arcuate surface 80 of an outer diameter about 0.005 inches less than the inner periphery of lip 14 and contoured substantially the same is provided by a radius turning tool to the electrode teeth as well as to all elements comprising electrode assembly 40. Outer platform diameter 82, surfaces 84 and 86, and an edge therebetween are machined thereafter. And finally hub surface 26, stem 28, rod 30, having a threaded area 32 are cut.

Figure 1A:
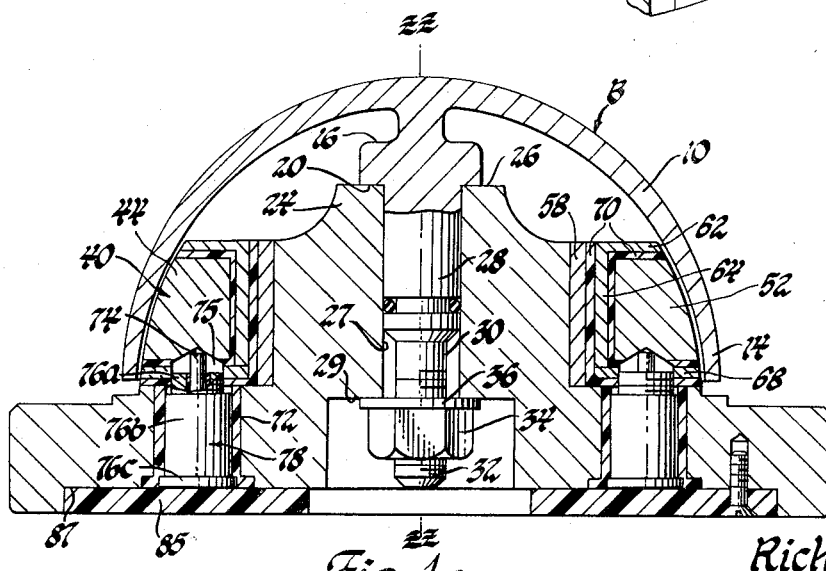
FIG. 1a is of another configuration in cross-section showing an alternative method for supporting the high-Q member relative to the electrode assembly.

Fabrication of the platform 12 is completed with the insertion of feedthrough connectors 78 and printed circuit board 85. Feedthrough connectors 78 are "-Microdot" connector C–051 –007 available from the Honeywell Corporation of Minneapolis, Minnesota, and are threaded into holes 75 previously tapped into potted holes 72. As shown in FIG. 1a, such connectors are comprised of a bronze or copper tipped pressure-contact probe 74 electrically insulated from an enveloping guard 76 comprised of a threaded portion 76a, a sleeve portion 76b, and a flange portion 76c. Threaded guard portion 76a is inserted to communicate with and terminate at guard base 68 in holes 75 therethrough.

Signals developed on the contact probe 74 are brought out thereby to printed circuit board 85 inserted in cavity 87 counterbored at the bottom of platform 12 as shown. Board 85 carries suitable contact pads for electrical connection with the probe 74 and the guard 76 of feed-through connector 78 and carries suitable circuit paths and elements for interconnecting the electrodes and operating the device, as to be more fully described below.

In the embodiment shown, bell B is then secured to platform 12 by means of a nut 34 and washer 36 acting on threaded area 32 of rod 30 to urge bell upper hub surface 18 and in turn lower hub surface 20 towards hub surface 26 of the post 24. Radial location of bell B is effected by the cooperation of the axial surface of bell bore 22 and post stem 28 thereby providing a gap of nominally 0.005 inches between the inside surfaces of lip 14 and surface 80.

In order to enhance the overall sensitivity of the device, a close correspondence of natural frequencies, such correspondence also known as degeneracy, is desired among all nodal and anti-nodal directions radial to polar axes Z–Z. While sides 10 of bell B are readily machinable to provide natural frequencies that are reasonably identical or degenerate along all axes perpendicular to polar axis Z—Z, the azimuth position of the bell may be adjusted about stem 28 before the tightening of nut 34 so as to align the sides to afford the closest agreement between the natural frequencies along radial directions defined by the eight electrodes.

Further, frequency degeneracy may be obtained by simply sanding appropriate regions of lip 14. Bell B of FIG. 1 is thereby tuned to have a basic natural frequency of 2,100 Hertz with the difference in frequencies along all radial directions degenerating to 0.03 Hertz or less.

The mode of affixing bell B to platform 12 may also be varied from that shown in FIG. 1 to effect the necessary frequency degeneracy. For instance, the clamping stresses created by nut 34 and post hub 26 acting on bell B might in some applications prevent the necessary degeneracy or such stresses might change randomly with temperature to in turn affect degeneracy and, therefore, instrument sensitivity. A mounting structure less sensitive to such stresses might therefore be employed in such situations. A structure believed to afford less degeneracy sensitivity to mounting stress and stress changes is shown in FIG. 1a. As there shown, rod 30 extending along the polar axis Z—Z from bell center area 16, having stem 28, and terminating in threaded area 32 may be machined integrally as a part of bell B rather than as a part of post 24. Bell B carrying rod 30 may then be inserted over post 24 into bore 27 and a counterbore 29 therein. Stem 28 would then locate bell B radially in bore 27 while nut 34 acting on threaded area 32 of rod 30 would push washer 36 against counterBore 29 thereby urging lower bell hub 20 toward post hub 26. Moreover, other configurations, not requiring clamping between hub 16 and post 24, are possible. For example, bell B could be suspended by an integral stem and base from housing sides 93 or other structures so that bell sides 12 and lip 14 still telescope and encircle electrode assembly 40 carried on post 24.

Housing 90 is comprised of a top surface 92 supporting central hub 91 having port 97 therethrough and axially-extending cylindrical sides 93 terminating in flange 94 at is open end. Holes 95 through flange 94 allow the insertion of bolts 96 to secure housing 90 to radial surface 84 of platform 12, and an O-ring 89 enables proper sealing between the platform surface 84 and housing flange 94. After such sealing, the application of a vacuum or the insertion of desirable gases is effected through port 97 which is thereafter sealable by means of plugs 99 and washer 98. Air may thus be withdrawn from housing 90 through port 97 so as to increase the Q of bell 10 by decreasing air damping. For instance, it has been found that by maintaining the bell in a vacuum on the order of $10^{-2}$ torrs increases the Q of the device fourfold and hence comparably increases the time constant, or ringing time, of oscillations in relation to the energy input per cycle.

GENERAL OPERATION

The operation of bell B to detect rotations of platform 12 will be described briefly with reference to FIG. 3, a more detailed description being found in the above cited application by Alfred G. Emslie. Operation of bell B requires that sides 10 be exercised or forced radially so as to flex lip 14 and establish therein a standing wave pattern defining nodal regions of normally quiescent radial vibrations and antinodal regions of normally maximum radial vibrations. Such flexing is initiated and sustained by an electromechanical self-oscillation loop comprised generally of forcer, sensor, and feedback means. The forcers are electrically energized at the natural frequency of the bell to flex lip 14 in a pattern having a set of antinodes along each of two mutually perpendicular directions radial to the input or polar axis Z—Z and a set of nodes along each of two mutually perpendicular directions midway between those associated with the antinodes. First sensor means detect the amplitude of vibrations of lip 14 antinodes, and the electrical feedback means connecting sensor to the forcer close a loop operative to flex the antinodal lip regions at constant maximum amplitude. Other sensor means detect those radial vibrations at a nodal region due to the motion of the lip associated with the standing wave pattern and rotation of the bell about its input axis, such nodal vibrations believed to be due to the effect of Coriolis forces.

DESCRIPTION OF OPERATION — FIG. 3

Figure 3:
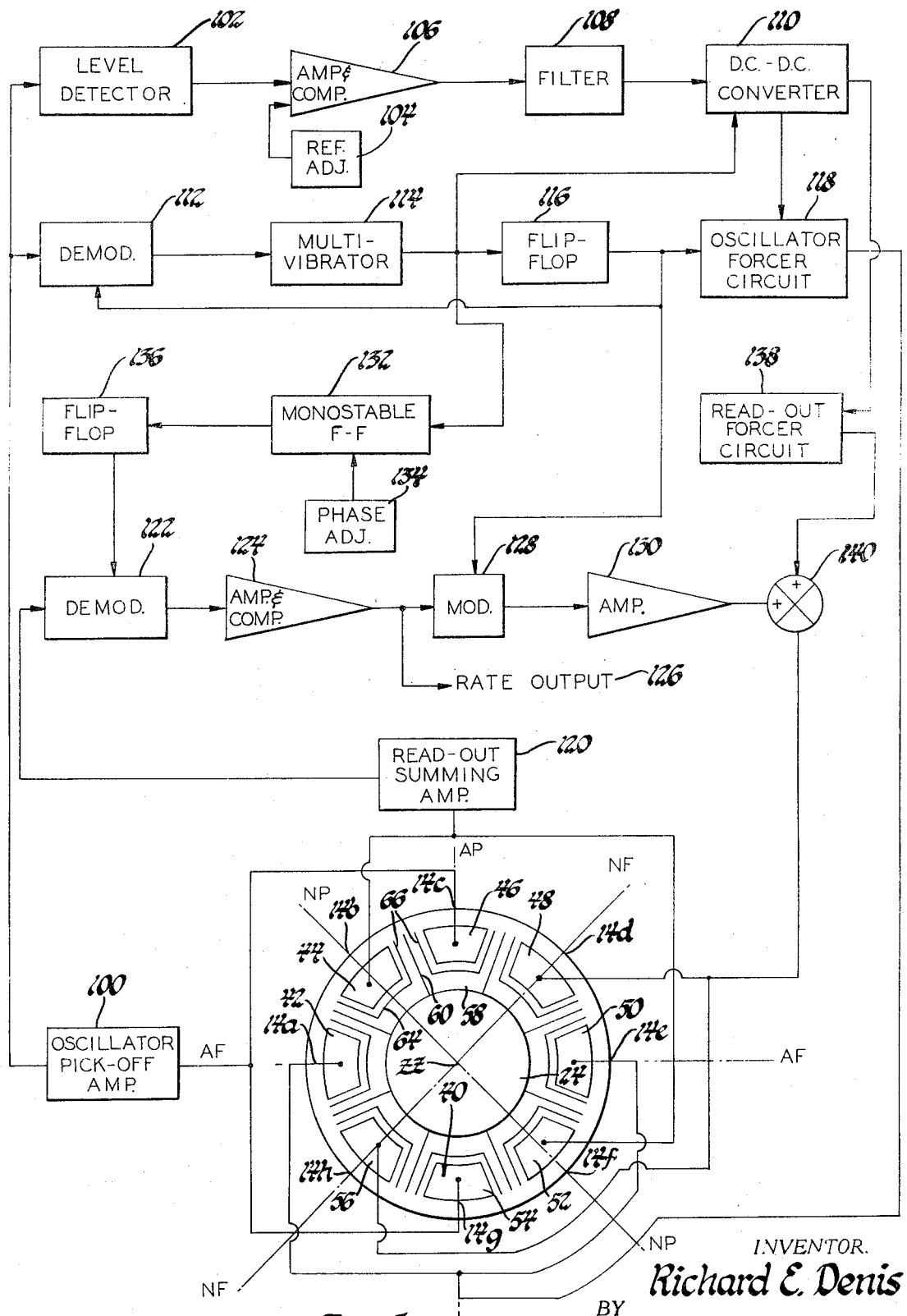
FIG. 3 is a block diagram of means whereby the bell-like member may be operated to indicate rotation about an axis.

The general operation and interconnection of a self-oscillator loop and readout loop for respectively effecting vibration and detecting rotations in the present invention may be understood with reference to FIG. 3. A more detailed description of circuits for effecting these loops may be found in copending U.S. Pat. application, Ser. No. 864,109 entitled "Bell Gyro and Improved Means for Operating Same," filed by David L. Lynch on Oct. 9, 1969 and assigned to the same assignee as the assignee of this application.

The means comprising the self-oscillation and readout loops are shown interconnected in block form in FIG. 3 with electrode assembly 40 shown in plan view using like designators for similar elements in FIG. 1. Thus, electrode assembly 40 is disposed between post 24 and lip 14 as shown, and is comprised as described above of shield hub 58, shield spokes 60, guard web 64, guard arms 66, and electrodes 42, 44, 46, 48, 50, 52, 54, and 56.

FIG. 3 self-oscillator loop is comprised generally of lip regions 14c and 14g of bell B, electrodes 46 and 54, oscillator pickoff amplifier 100, level detector 102, amplifier 106, filter 108, dc-to-dc converter 110, demodulator 112, multivibrator 114, flip-flop 116, oscillator forcer circuit 118, electrodes 42 and 50, and lip regions 14a and 14e.

Electrodes 42 and 50 are oscillator forcer electrodes connected in parallel to oscillator forcer circuit 118 and operative to impart radial exercising vibrations to bell B by applying varying attractive potential at lip regions 14a and 14e along an anti-nodal forcing axis AF—AF normal to the polar or input axis Z—Z. Electrodes 46 and 54 are oscillator pickoff electrodes connected in parallel to oscillator pickoff amplifier 100 and operative to detect radial vibrations of bell B by measuring the varying potential at lip regions 14c and 14g along an antinodal pickoff axis AP—AP normal to both the AF—AF and Z—Z axes.

The output of oscillator pickoff amplifier 100 is connected parallely both to level detector 102 and to demodulator 112. A source of adjustable reference potential 104 is also connected to an input terminal of level detector 102, the output of which is connected to dc-to-dc converter 110 through amplifier and compensator 106 and filter 108 to regulate the amplitude of the exercising wave. Demodulator 112 is connected to multivibrator 114 and therefrom to both converter 110 and to frequency dividing flip-flop 116. Synchronization pulses are provided by flip-flop 116 back to demodulator 112, to oscillator forcer circuit 118, and also to chopping modulator 128 in the readout loop. The output of demodulator 112 regulates the frequency of multivibrator 114 driving frequency dividing flip-flop 116, which in turn slaves at substantially the resonant frequency of lip 14 both the frequency of demodulator 112 and the frequency with which oscillator driver 118 applies a forcing potential to electrodes 42 and 50.

At start-up, the difference in amplitude between reference potential 104 and the signal from amplifier 100 corresponding to the maximum amplitude of lip 14 at regions 14c and 14g is of sufficient magnitude and a polarity to cause an output from dc-to-dc converter 110 to oscillator forcer circuit 118. The amplitude and frequency of the varying potential to oscillator forcer electrodes 42 and 50 and lip regions 14a and 14e therefore tends to increase the amplitude of lip vibrations. As the amplitude of lip vibrations increase, the input to detector 102 increases the difference from that provided by reference 104. The output from level detector 102 to converter 110 consequently increases to ultimately stabilize at a value corresponding to a substantially constant maximum amplitude of lip variation, such amplitude being adjustable by setting reference potential 104.

Free running multivibrator 114 is biased at startup to operate converter 110 and to cause the output from frequency divider 116 to oscillator forcer circuit 118 to be less than the resonant frequency of lip 14. Thereafter, the bias to multivibrator 114 is adjusted by the output of demodulator 112 to effect a frequency which produces a maximum amplitude at lip 14 for the converter-regulated forcing potential. The output of multivibrator 114 is also applied to monostable vibrator 132, wherein the pulses from 114 are phase shifted by adjustment means 134 and then applied to demodulator 122 after frequency division by flip-flop 136.

The readout loop is comprised generally of lip regions 14b and 14f of bell B, readout pickoff electrodes 44 and 52, readout summing amplifier 120, demodulator 122, phase shifting monostable vibrator 132, frequency dividing flip-flop 136, compensator amplifier 134, chopping modulator 128, amplifier 130, readout forcer circuits 138, readout forcer electrodes 48 and 56, and back to lip 14 at regions 14d and 14h.

Electrodes 44 and 52 are readout pickoff electrodes connected in parallel to readout summing amplifier 120 and operative to detect radial vibrations of bell B by measuring the varying potential at lip regions 14b and 14f along a nodal pickoff axis NP—NP between AF—AF and AP—AP axes. Similarly, electrodes 48 and 56 are readout forcer electrodes connected in parallel to amplifier 130 and readout forcer circuit 138 and operative to impart radial vibrations of proper frequency and amplitude to bell B by applying varying attractive potential at lip regions 14a and 14b along nodal forcing axis NF—NF between the AP—AP and AF—AF axes and normal to the NP-NP axis to null the vibrations sensed by readout pickoff electrodes 44 and 52.

The output of readout pickoff amplifier 120 is connected to demodulator 122, the output of which after amplification and compensation in amplifier 124 provides a signal at 126 proportional to the rate of rotation of bell B about axis of symmetry Z—Z. Signal 126 may also be used to energize means (not shown) generating pulses that can be counted to indicate the amount of rotation about axis Z—Z over a given period of time, thereby indicating angular displacement of bell B about axis Z—Z.

The output of amplifier 124 is also chopped or modulated in the present embodiment at a frequency determined by the output of flip-flop 116 to provide a varying potential from amplifier 130 that is summed at 140 with a regulated DC potential from readout forcer circuit 138 energized by the output of dc-to-dc converter 110. The forcing potential subsequently applied to electrodes 48 and 56 is a dc bias that is augmented by a potential having an amplitude proportional to the input rate, a frequency determined by multivibrator 114 and flip-flop 116 to be substantially the resonant frequency of lip 14, and a phase of 180° opposite to the vibration of lip regions 14b and 14f.

The subject invention has application wherever it is desired to detect motion of a structure about an axis. Applications where the device may be used include those to indicate horizontal and vertical directions, to provide a strapped-down or gimballed reference platform, to stabilize a structure against external motions, or to navigate a vehicle over desired course. Moreover, having described one embodiment of the present invention it is understood that the specific terms and examples are employed in a descriptive sense and not for the purpose of limitation. It will be obvious to those skilled in the art that modifications and changes may be made without departing from my invention and I, therefore, aim in the appended claims to cover such modifications and changes as fall within the true spirit and scope of my invention.

What I claim as new and desire to secure by letters of patent of the United States is:

1. In an apparatus for sensing motion having a component about an axis extending in a predetermined direction:
   a. a platform;
   b. a post upstanding from said platform at said axis;
   c. a bell-like member having an axis substantially coincident with said axis, having a center region supported by said post, and depending from the top of the post to telescope over said post and to define a lip adjacent the platform and capable of low loss radial vibrations;
   d. forcer means supported from the platform and operative to impart radial lip vibrations defining nodal and antinodal regions spaced circumferentially thereabout;
   e. sensor means supported from the platform and responsive to radial vibration of the lip at at least one of said nodal regions whereby the vibrations sensed thereat vary in accordance with the rotation of said platform about said axis;
   f. one of said forcer and sensor means supported by said post within the confines of the bell-like member and forming a rigid integral structure within said post; and
   g. one of said post and bell member having a stem and the other a bore to receive said stem for positioning said bell member radially with respect to said axis and for allowing said lip to be positioned circumferentially with respect to said one of said forcer and sensor means.

2. In an apparatus for sensing motion having a component about an axis extending in a predetermined direction:
  a. a platform;
  b. a post carried by said platform and extending therefrom about said axis;
  c. a bell-like conductive member having a center region supported by said post and having annular sides symmetrical about said axis encircling said post and capable of low loss radial vibrations relative thereto;
  d. forcer electrode means forming an integral structure with said post and defining a conductive face concentric about said axis and in juxtaposition with an inside face of the member to impart when electrically energized radial vibrations in said sides to define nodal and anti-nodal regions therein spaced circumferentially thereabout;
  e. sensor electrode means forming an integral structure with said post and defining a conductive face concentric about said axis and in juxtaposition with an inside face of the member to respond in impedance variation to movements of the member at said nodes, whereby the impedance sensed varies in accordance with the motion of said platform about said axis;
  f. guard electrode means enveloping the top, bottom, and sides, and inboard surfaces of said sensor electrode means and electrically isolated therefrom;
  g. a conductor insulatingly extending through said guard means to said sensor electrode; and
  h. one of said post and bell member having a stem and the other having a bore to receive said stem for positioning said bell member radially with respect to said axis and for allowing said sides to be positioned circumferentially with respect to one of said forcer and sensor electrode means.

3. In an apparatus for sensing motion having a component about an axis in a predetermined direction:
  a. a platform;
  b. a bell-like member having a center region supported from said platform by a stem along said axis, said center region having annular sides extending therefrom symmetrically about said axis and capable of low loss radial vibrations relative thereto;
  c. a post carried by said platform and extending therefrom towards said stem along said axis;
  d. forcer means disposed on said platform and operative to impart in said sides radial vibrations defining nodal and antinodal regions spaced circumferentially thereabout;
  e. sensor means disposed on said platform and responsive to radial movements of a said nodal region thereof whereby the movements sensed thereat vary in accordance with motion of said platform about said axis; and
  f. one of said forcer and sensor means supported by said post within the confines of the bell member, forming a rigid integral structure with said post, and having a face concentric about said axis.

4. In an apparatus for sensing motion having a component about an axis in a predetermined direction;
  a. a platform;
  b. a bell-like conductive member having a center region supported from said platform by a stem on said axis said center region having annular sides extending symmetrically therefrom along said axis and capable of low loss radial vibrations relative thereto;
  c. a post carried by said platform and extending therefrom towards said stem along said axis;
  d. forcer means forming a rigid integral structure with said post and having a face concentric about said axis, said forcer means operative to impart radial vibrations in said sides defining nodal and anti-nodal regions spaced circumferentially thereabout;
  e. sensor electrode means forming a rigid integral structure with said post and having a face concentric about said axis, said sensor electrode means responsive to radial movements in said sides at said nodal region whereby the movements sensed vary in accordance with motion of said platform about said axis;
  f. guard electrode means enveloping the top, bottom and sides, and inboard surfaces of said sensor electrode means and electrically isolated therefrom; and
  g. a conductor insulatingly extending through said guard means to said sensor electrode means.

5. In an apparatus for detecting motion of a platform about an axis:
  a. a platform defining a floor and a cylindrical post upstanding therefrom along said axis;
  b. a spider-like conducting shield ring having a cylindrical hub in secure engagement with said post and plurality of spokes extending radially from said hub thereby defining a series of segmental spaces;
  c. a guard tab secured in each said space by insulating cement and spaced thereby from said floor and spikes;
  d. a guard cage in each said space comprised of a top, a cylindrical web portion depending therefrom and mated to said guard tab, and sets of arms mated to and bounding said web portion and extending radially therefrom, said web portion secured in spaced juxtaposition from said shield hub by insulating cement, and said arms bounding said shield spokes and secured spaced therefrom by insulating cement;
  e. an electrode tooth secured in each said space by insulating cement and spaced thereby from said top, said tab, said web portion, and said arms;
  f. a bell-like member having a center region supported along said axis and sides flaring outwards therefrom over said post and said outer surfaces of said electrode teeth, said sides capable of low loss radial vibrations;
  g. first circuit means connected to a first of said electrode teeth and operative to develop a varying potential difference between said tooth and said side to establish therein a vibration pattern defining nodal and anti-nodal regions when the platform does not rotate; and
  h. second circuit means connected to a second electrode tooth located at a said nodal region, said second circuit operative to develop signals varying with the radial vibration developed at said nodal region by the effects of said side vibrations and rotation of the platform about said axis.

6. In a method of manufacturing an apparatus for detecting rotation of a platform about an axis through the vibratory action of a bell-like member having an arcuate inner periphery of predetermined contour and supported by a cylindrical post telescoped within the same, the steps comprising:
   a. securing a disk of electrode material in a cup-like member defining a floor and said cylindrical post, the disk having a base adjacent said floor and being composed of an outer ring with internally-extending radially-oriented teeth, one tooth for each electrode, the teeth defining at their inboard ends a cylindrical surface in spaced relation to said post, the teeth being insulatingly separated from each other, the post, and the floor, and the entire assembly forming a rigid integral structure; and
   b. removing electrode material from the periphery of the disk to points inboard of the outer ring to form tooth fragments insulated from each other and defining electrodes, the outer face of the resulting device being substantially the contour of the inner periphery of the bell-like member so as to receive the same.

7. In a method of manufacturing an apparatus for detecting rotation of a platform about an axis through the vibratory action of a bell-like member having an arcuate inner periphery of predetermined contour and supported by a cylindrical post telescoped within the same, the unit including shielded and guarded electrodes, the steps comprising:
   a. nesting, in a cup-like member defining a floor, said cylindrical post and a floor lip and a cylindrical rim, a spider-like conducting shield ring having a plurality of spokes terminating in spaced relation to the inner face of said rim and having a cylindrical hub in secure engagement with the post, thereby defining a series of segmental spaces;
   b. sliding a conducting guard base over the shield ring to seat on said floor lip, said guard base having a circular outer periphery in juxtaposition with the interior face of said rim and radial slots fitting over the spokes;
   c. telescoping a conducting disk into the assembly as thus made, the disk having a base mating with the top face of the guard base and being composed of an outer ring with internally-extending radially oriented teeth, one tooth for each electrode, the teeth fitting into the aforesaid segmental spaces, the teeth being in spaced relation to the shield ring at their inboard ends and sides;
   d. telescoping a conducting guard cage assembly inside of and between the teeth of the disk, the guard cage assembly comprising a top ring member seated on the outer ring having dependent radially extending conducting guard ring arms sandwiching the spokes of the shield ring and inboard part-cylindrical web portions located inside the teeth and joining adjacent ones of the guard ring arms;
   e. filling with an insulating cement the spaces between adjacent portions of said floor and guard cage, said shield hub and said guard web, said shield spokes and said guard arms, and said teeth and said guard base hub, arms, and top ring; and
   f. removing material from the periphery of the assembly thus made to points inboard of the outer ring to form electrodes from the tooth fragments having guard electrodes and shield electrodes between them.

8. In an apparatus for detecting motion of a platform about an axis:
   a. a platform member including a base, a post upstanding therefrom along said axis, and at least one space formed in said platform radially from the axis;
   b. a guard located in said space and supported therein by electrical insulating means and defining a cage having an open end facing radially outwardly;
   c. a first electrode located in said cage and secured thereto by electrical insulating means disposed between the cage and said first electrode, said post, electrode, cage, ad insulating means forming a rigid integral structure;
   d. a bell-like conductive member having a center region supported along said axis and sides flaring outwards therefrom over said post and first electrode, said sides capable of low-loss radial vibrations;
   e. first circuit means connected to a second electrode and connected to be operative to develop a varying potential difference between said electrodes and said side to establish therein a vibration pattern defining nodal and anti-nodal regions when the platform does not rotate;
   f. second circuit means connected to said first electrode located at a said nodal region, said second circuit operative to develop signals varying with the radial vibrations developed at said nodal region by the effects of said side vibrations and rotation of the platform about said axis; and
   g. imperforate housing means affixed to said platform, telescoped over said bell member, whereby the atmosphere enveloping said bell may be predetermined.

* * * * *

PO-1050
(5/69)

UNITED STATES PATENT OFFICE
CERTIFICATE OF CORRECTION

Patent No. 3,680,391    Dated August 1, 1972

Inventor(s) Richard E. Denis

It is certified that error appears in the above-identified patent and that said Letters Patent are hereby corrected as shown below:

Patent Column 1, line 31, "oscillation" should read
-- self-oscillation --;

line 55, "Q member" should read
-- high-Q member --;

line 39, before "FIG. 3", insert
-- The --;

Patent Column 9, line 47, "134" should read -- 124 --;

Patent Column 12, line 40, "spikes" should read
-- spokes --; and,

Patent Column 14, line 31, "ad" should read -- and --.

Signed and sealed this 20th day of March 1973.

(SEAL)
Attest:

EDWARD M. FLETCHER, JR.    ROBERT GOTTSCHALK
Attesting Officer       Commissioner of Patents